United States Patent
Rudge

(10) Patent No.: US 8,016,096 B2
(45) Date of Patent: Sep. 13, 2011

(54) VEHICLE CONVEYOR WITH MAINTENANCE SUPPORT DEVICE

(75) Inventor: Brian W. Rudge, Carlisle, PA (US)

(73) Assignee: Volvo Construction Equipment AB, Eskilstuna (SE)

( * ) Notice: Subject to any disclaimer, the term of this patent is extended or adjusted under 35 U.S.C. 154(b) by 246 days.

(21) Appl. No.: 12/442,101

(22) PCT Filed: Oct. 1, 2007

(86) PCT No.: PCT/US2007/021118
§ 371 (c)(1),
(2), (4) Date: Apr. 21, 2009

(87) PCT Pub. No.: WO2008/042352
PCT Pub. Date: Apr. 10, 2008

(65) Prior Publication Data
US 2009/0272622 A1    Nov. 5, 2009

Related U.S. Application Data

(60) Provisional application No. 60/848,180, filed on Sep. 29, 2006.

(51) Int. Cl.
*B65G 21/10* (2006.01)
(52) U.S. Cl. .................. 198/312; 198/632
(58) Field of Classification Search .................. 198/300, 198/312, 309, 583, 632
See application file for complete search history.

(56) References Cited

U.S. PATENT DOCUMENTS

| | | | | |
|---|---|---|---|---|
| 1,596,803 A | * | 8/1926 | Callahan | 198/312 |
| 1,603,633 A | * | 10/1926 | Nelson | 198/583 |
| 2,389,779 A | | 11/1945 | Heller | |
| 2,725,757 A | | 12/1955 | Murphy | |
| 3,122,251 A | * | 2/1964 | Gardipee | 198/312 |
| 3,245,159 A | | 4/1966 | MacDonald | |
| 3,485,304 A | * | 12/1969 | Daymon | 198/312 |
| 3,590,983 A | | 7/1971 | Oury | |
| 3,709,360 A | * | 1/1973 | Baker | 198/632 |
| 3,991,494 A | | 11/1976 | Schuermann et al. | |
| 5,297,914 A | * | 3/1994 | Ash | 198/632 |
| 2003/0010600 A1 | | 1/2003 | Speers et al. | |

FOREIGN PATENT DOCUMENTS
EP       0185023 B1   10/1988
* cited by examiner

*Primary Examiner* — James R Bidwell
(74) *Attorney, Agent, or Firm* — Michael Best & Friedrich LLP

(57) ABSTRACT

A conveyor for a construction vehicle includes a frame removably connectable with the vehicle. The frame includes front and rear ends, first and second sides extending between the two ends, and upper and lower surfaces extending between the front and rear ends. An endless belt is disposed generally about the frame and at least one support member is connected with the frame. The support member has a first, vertical portion connected with the frame first side and a second, horizontal portion extending generally beneath the frame lower surface and being disposable upon a base surface. The support member is configured to retain the entire frame and the belt spaced generally above the base surface so as to facilitate removal of the belt from the frame and alternatively facilitate installation of the belt upon the frame. The support member may include an L-shaped bended bar.

27 Claims, 6 Drawing Sheets

VEHICLE CONVEYOR WITH MAINTENANCE SUPPORT DEVICE

CROSS-REFERENCE TO RELATED APPLICATIONS

This patent application is a national stage filing under 35 U.S.C. 371 of International Application No. PCT/US2007/021118, filed 1 Oct. 2007, which claims priority to U.S. Provisional Patent Application No. 60/848,180, filed 29 Sep. 2006, the entire contents of which are hereby incorporated by reference. Priority to each application is hereby claimed.

The present invention relates to conveyors, and more particularly to conveyors for construction vehicles such as road milling machines.

A road milling machine basically includes a mainframe with a rotatable drum for cutting roadway material. One or more conveyors are generally provided to transport material from a location proximal to the cutting drum to a remote location for removal, such as onto a dump truck or other material transport vehicle. When maintenance is required on one of these conveyors, such as replacing a worn conveyor belt, the conveyor is disconnected from the mainframe and placed upon a base surface. As these vehicle conveyors are relatively heavy, it is generally difficult to manipulate the conveyor during such maintenance procedures, such that a crane or similar device is often required to perform such activities.

SUMMARY OF THE INVENTION

In one aspect, the present invention is a support device for a vehicle conveyor, the conveyor being removably connectable with a vehicle. The conveyor includes a frame, the frame having front and rear ends, a centerline extending between the two ends, and first and second sides extending between the two ends and located on opposing sides of the centerline, and an endless belt disposed generally about the frame. The support device comprises at least one support member having a first end connected with the frame and a second end disposable upon a base surface. The at least one support member is configured to retain the entire conveyor spaced generally above the base surface so as to facilitate removal of the belt from the frame and alternatively facilitate installation of the belt upon the frame.

In another aspect, the present invention is a conveyor for a construction vehicle. The conveyor comprises a frame removably connectable with the vehicle, the frame including front and rear ends, a centerline extending between the two ends, and first and second sides extending between the two ends and located on opposing sides of the centerline. An endless belt is disposed generally about the frame and at least one support member has a first end connected with the frame and a second end disposable upon a base surface. The at least one support member is configured to retain the entire conveyor spaced generally above the base surface so as to facilitate removal of the belt from the frame and alternatively facilitate installation of the belt upon the frame.

In a further aspect, the present invention is a conveyor for a construction vehicle, the conveyor comprising a frame removably connectable with the vehicle, the frame including front and rear ends, first and second sides extending between the two ends, and upper and lower surfaces extending between the front and rear ends. An endless belt is disposed generally about the frame. Further, a pair of generally L-shaped support members each have a generally vertical portion connected with the frame first side and a generally horizontal portion extending generally beneath the frame lower surface and being disposable upon a base surface. The two support members are configured to retain the entire frame and the belt spaced generally above the base surface so as to facilitate removal of the belt from the frame and alternatively facilitate installation of the belt upon the frame.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
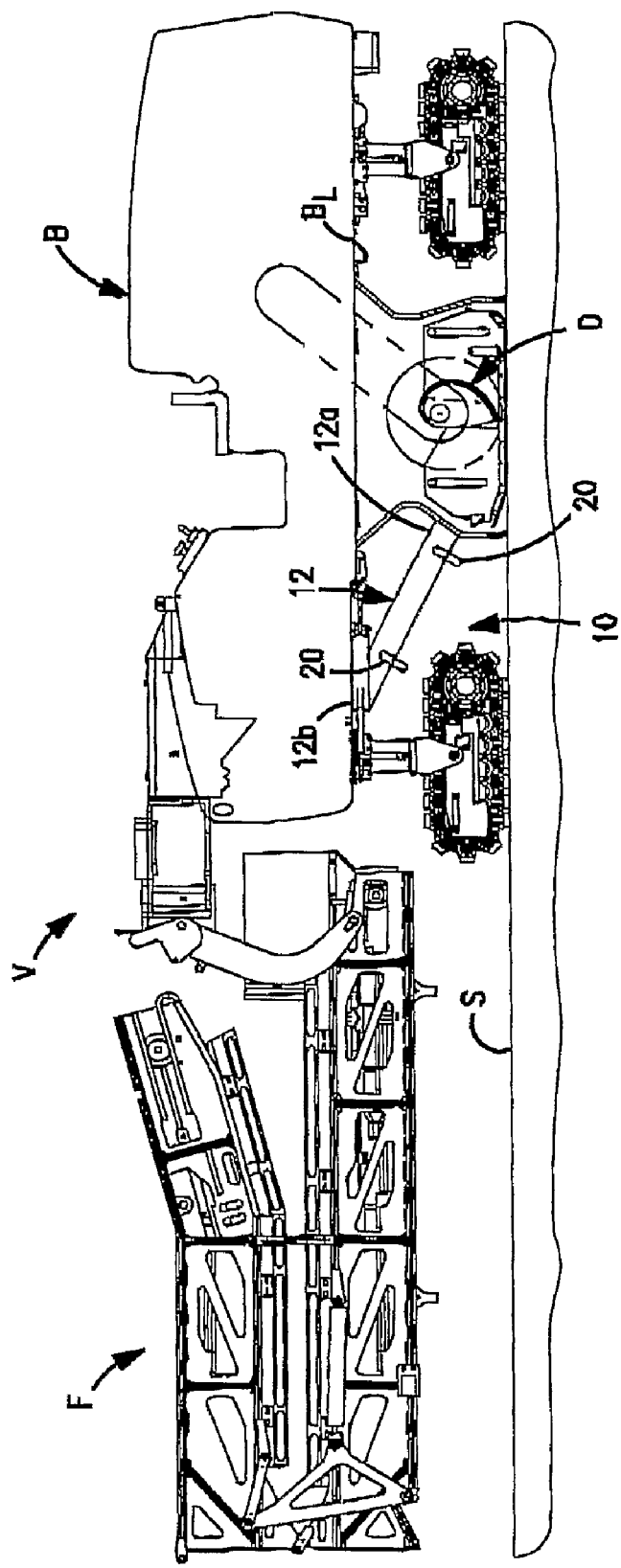
FIG. 1 is a side elevational view of a road milling machine including a conveyor with a support device in accordance with the present invention.

Certain terminology is used in the following description for convenience only and is not limiting. The words "right", "left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Figure 2:
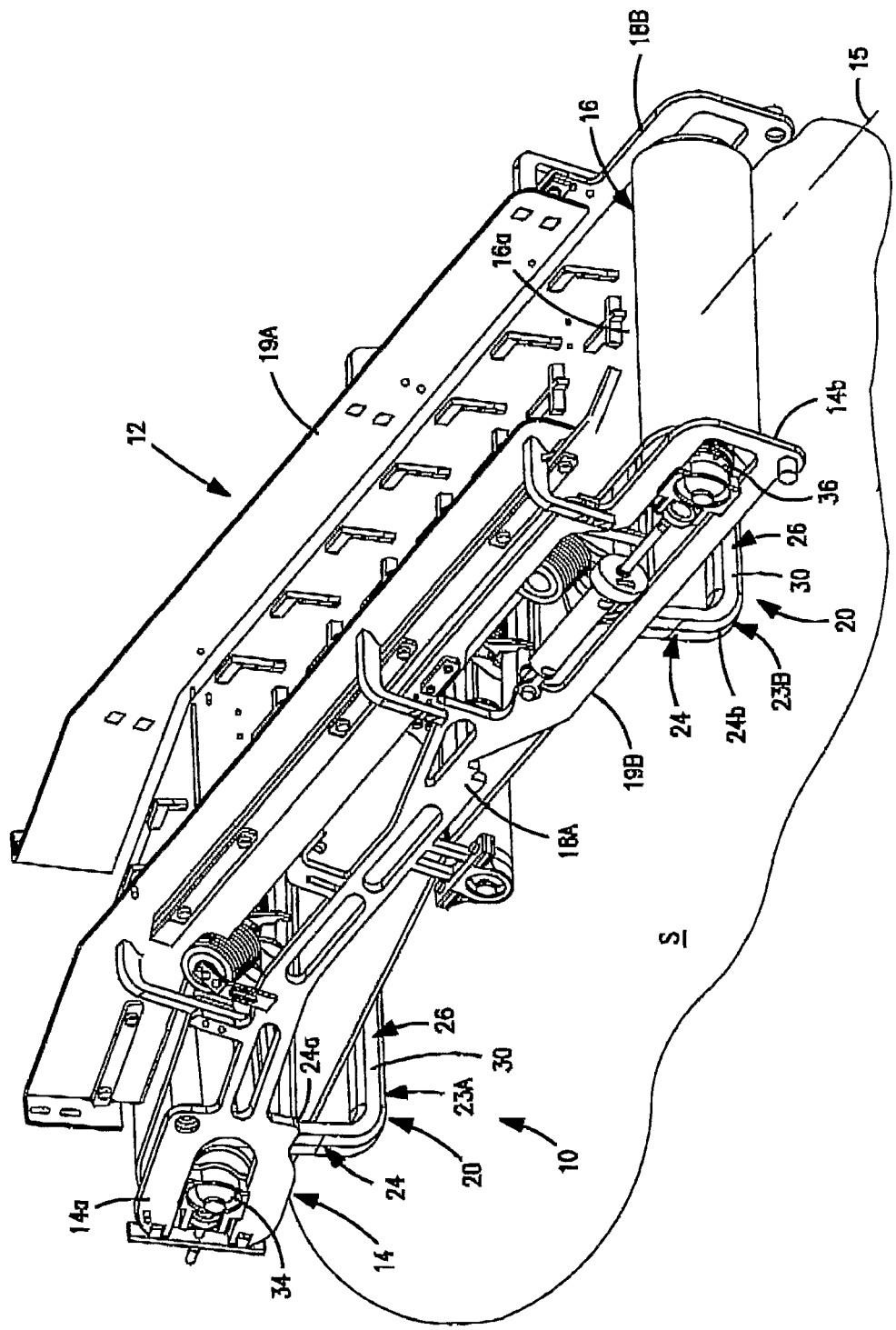
FIG. 2 is a perspective view of the conveyor and the support device.
Figure 3:
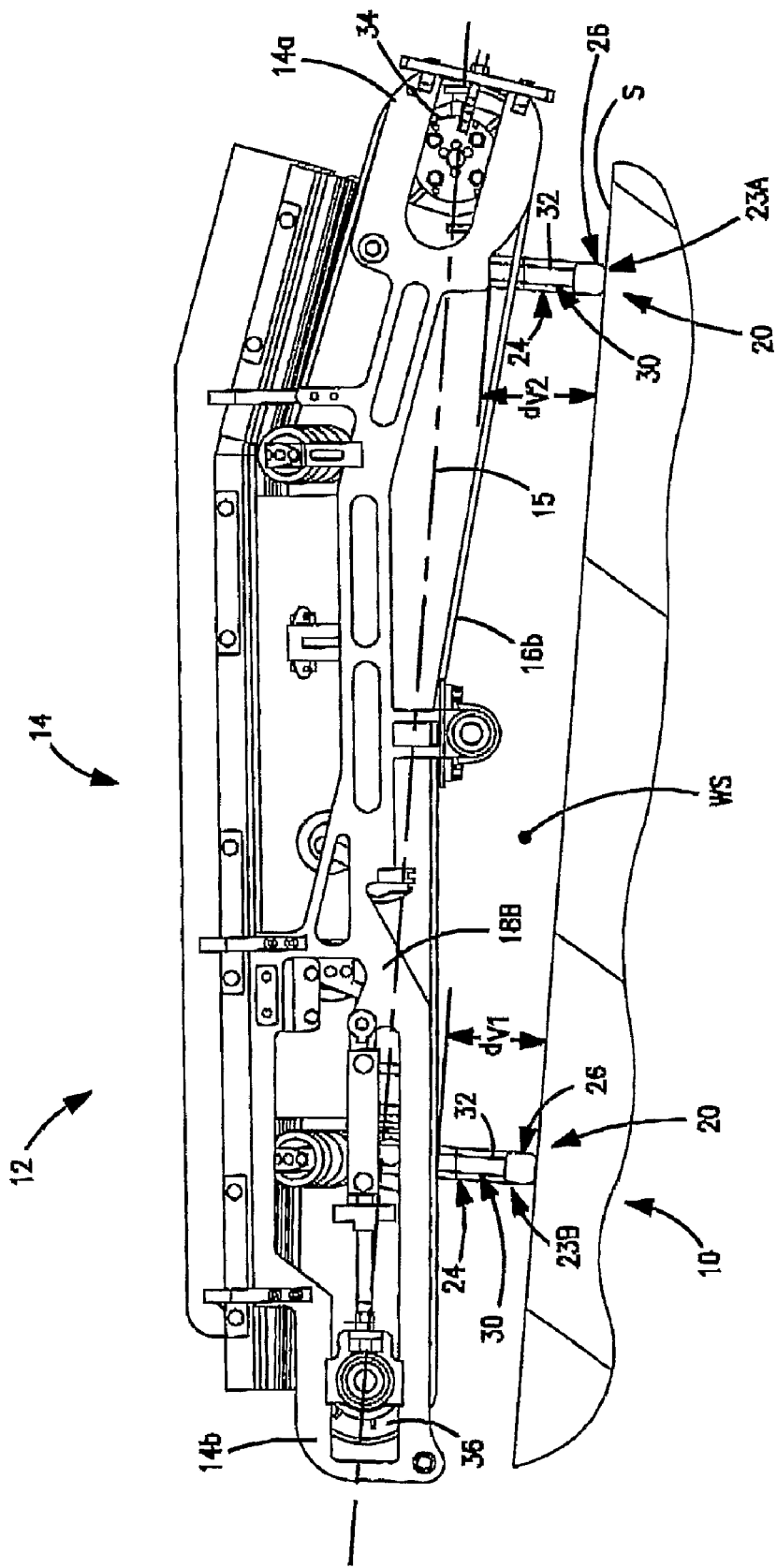
FIG. 3 is a side elevation view of the conveyor and the support device.

Referring now to the drawings in detail, wherein like numbers are used to indicate like elements throughout, there is shown in FIGS. 1-7 a support device 10 for a construction vehicle conveyor 12, the conveyor 12 being removably connectable with a vehicle V, preferably a road milling machine, so as to be disposable upon a base surface S. The conveyor 12 has a center of mass CM and includes a frame 14 and an endless belt 16. The frame 14 has a central longitudinal axis 15, first and second ends 14a, 14b spaced apart along the axis 15, first and second sides 18A, 18B extending between the two ends 14a, 14b and located on opposing sides of the axis 15, and upper and lower surfaces 19A, 19B. The endless belt 16 is disposed upon the frame 14 so as to extend about the first and second ends 14a, 14b. The support device 10 basically comprises at least one and preferably two support members 20 spaced apart along the conveyor axis 15, each support member 20 having a first end 21 connected with the first frame side 18A and a second end 22 disposable upon a base surface S, i.e., when the frame 14 is disconnected or separate from the vehicle V. The support member(s) 20 are configured to retain the entire conveyor 12 (i.e., as opposed to a portion or section of the conveyor) spaced above the base surface S when the conveyor 12 is separate from the vehicle frame or body B. Specifically, the one or more support members 20 are each configured to retain the frame 14 at about a vertical distance $d_{VN}$ (e.g. $d_{V1}$, $d_{V2}$) from the base surface S so as to provide a working space WS between the frame lower surface 19B and the base surface S, as indicated in FIG. 3.

By having a support device 10 that retains the frame 14 spaced above the base surface S, the belt 16 is laterally displaceable generally over the frame second side 18B in opposing lateral directions $L_1$, $L_2$ generally perpendicular to the central axis 15 (see FIG. 5), while the support member(s) 20 retain the frame 14 spaced above the base surface S. Thereby, the belt 16 may either be separated or removed from the frame 14 or alternatively installed upon the frame 14. However, by being connected with the frame first side 18A, the support member(s) 20 basically prevent lateral displacement of the belt 16 over the frame first side 18A. Also, providing the working space WS enables a worker to access lower sections of the frame 14 or other conveyor components to perform repair or maintenance thereon.

Further, each support member 20 has a first, upper portion 24 that is preferably fixedly connected with the frame side 18A and a second, lower portion 26 extending at least partially below the frame lower surface 19B. The support device 10 is preferably constructed such that the support lower portion 26 remains positioned beneath the frame 14 during use of the conveyor 12. In other words, the support member(s) 20 each remain in a fixed position, ready for use to support the conveyor 12, even when the conveyor 12 is connected with the construction vehicle V and is being used to transport material. As such, the support device 10 is not required to be attached or otherwise manipulated to a usage configuration, and the conveyor 12 can merely be disconnected from the vehicle body B and is held in a supported position. Further, the support member first ends 21 may be fixedly connected with the frame 14 by any appropriate means, such as by welding, rivets, etc.

Figure 6:
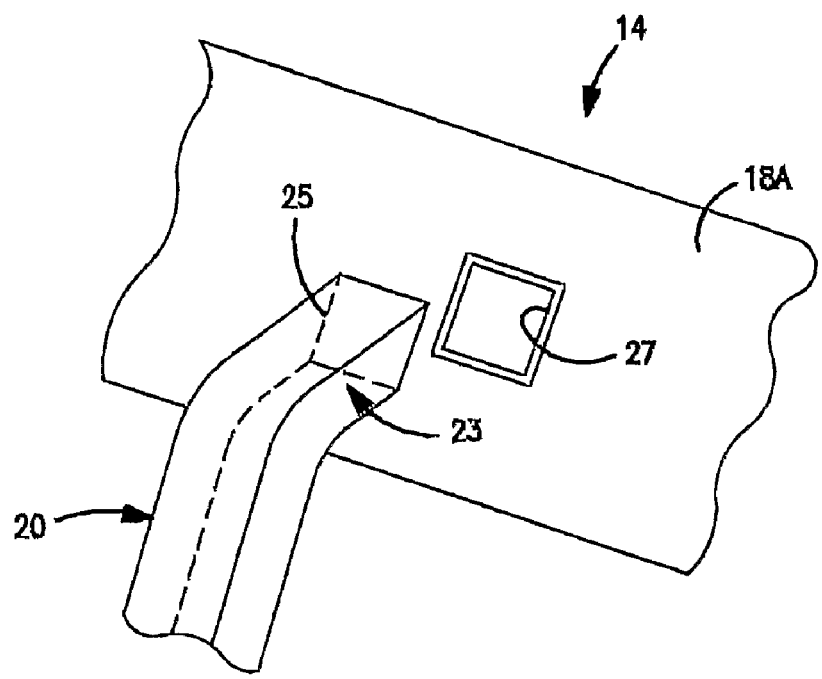
FIG. 6 is an enlarged, broken-away view of the conveyor and a first end of an alternative construction of a support member of the support device.
Figure 7:
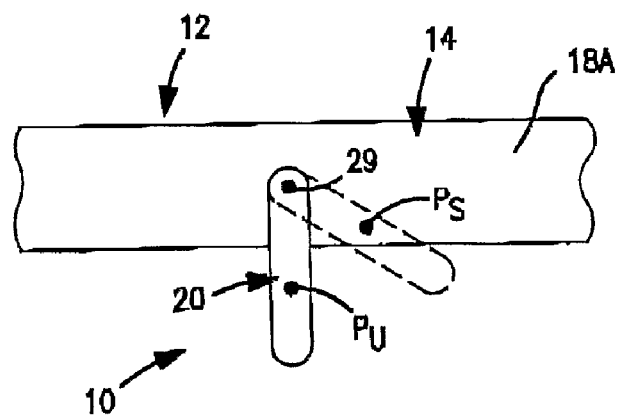
FIG. 7 is a broken-away side plan view of one support member of another alternative construction of the support member, showing the support member in a use position and in a storage position (in phantom).

Alternatively, the support members 20 may each be removably connected with the frame 14, so as to be separable from the conveyor 12, such as by means of threaded fasteners, etc. Also, each support member 20 may be configured to releasably connect with the conveyor first side 18A, such that the support device 10 is readily connected with the frame 14 to perform maintenance on the conveyor 14 and is otherwise separate from the frame 14 during use of the conveyor 14. Such releasable connection may be achieved by forming the support member first ends 21 with a male portion or prong 25 that is receivable within a female portion or socket 27 on the conveyor frame 14, as depicted in FIG. 6, or by any other appropriate means. As a further alternative, the support members 20 may be movably coupled with the frame 14, for example, each support member 20 may be pivotally connected with the frame first side 18A such that the support member 20 is angularly moveable or displaceable about an axis 29 between a storage position $P_S$ and a use position $P_U$, as shown in FIG. 7.

Figure 4:
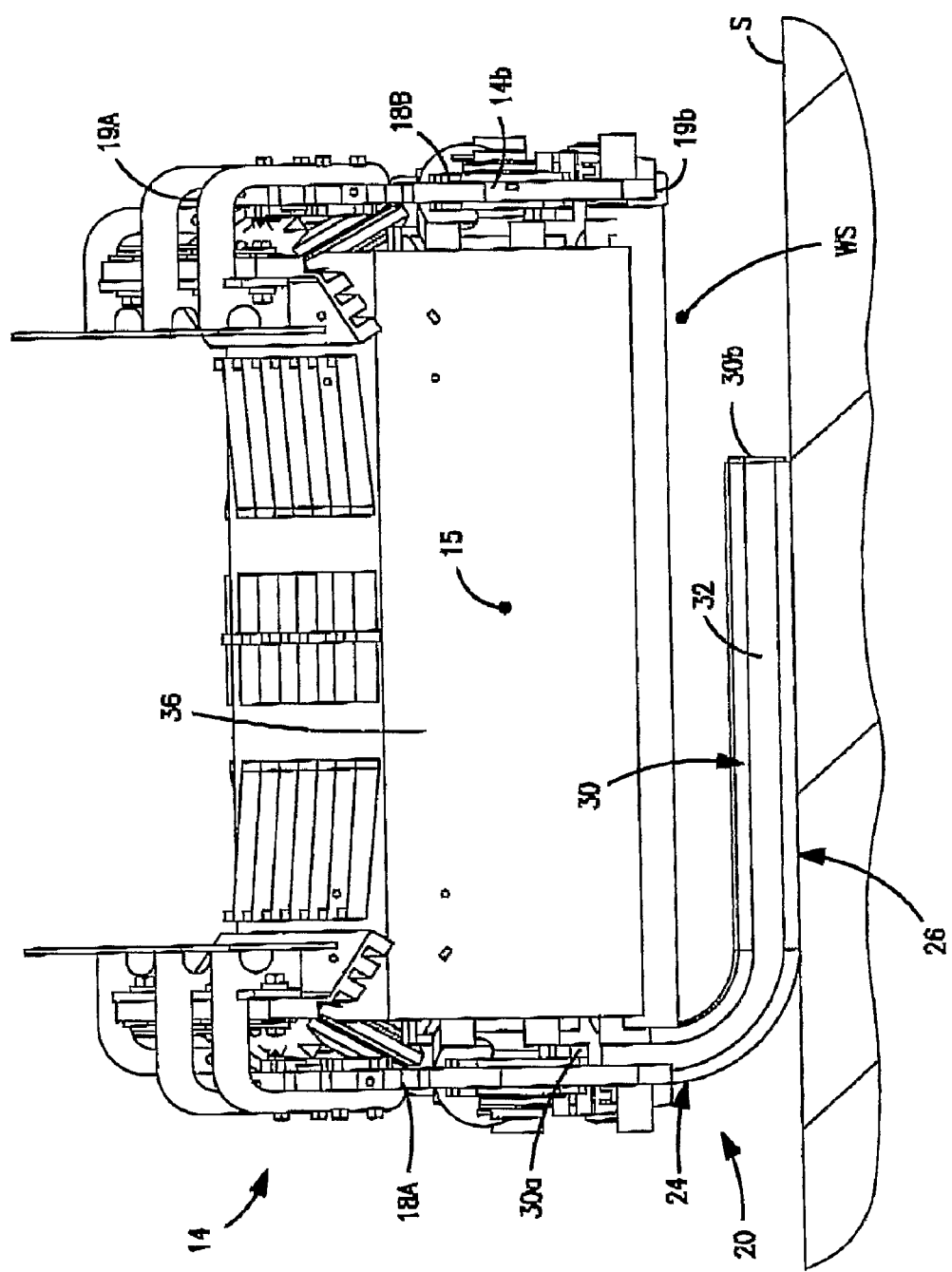
FIG. 4 is a front end view of the conveyor and the support device.

Referring to FIGS. 2-4, each support member 20 is preferably constructed such that each first portion 24 extends generally vertically (i.e., when oriented in a usage position or on the base surface S) and has a first end 24a connected with the frame side 18A and an opposing second end 24B. Each support member second portion 26 extends generally horizontally, thus perpendicularly with respect to the first portion 24, is connected with the first portion second end 24b and is disposable upon the base surface S. Further, the body second portion 26 is spaced vertically downwardly from or beneath the frame lower surface 19B and extends generally between and is spaced below the frame first and second sides 18A, 18B. Preferably, the support member first and second portions 24, 26 are integrally formed, as described below, but may be formed of two or more connected together members or parts. As best shown in FIGS. 2 and 4, the support members 20 each preferably include a generally cantilever body 30 having a first end 30a connected with the frame 14 and a second, free end 30b disposable upon the base surface S. Each cantilever body 30 is preferably formed as a bended bar 32 providing the support member first and second portions 24, 26, which is most preferably generally L-shaped.

Figure 5:
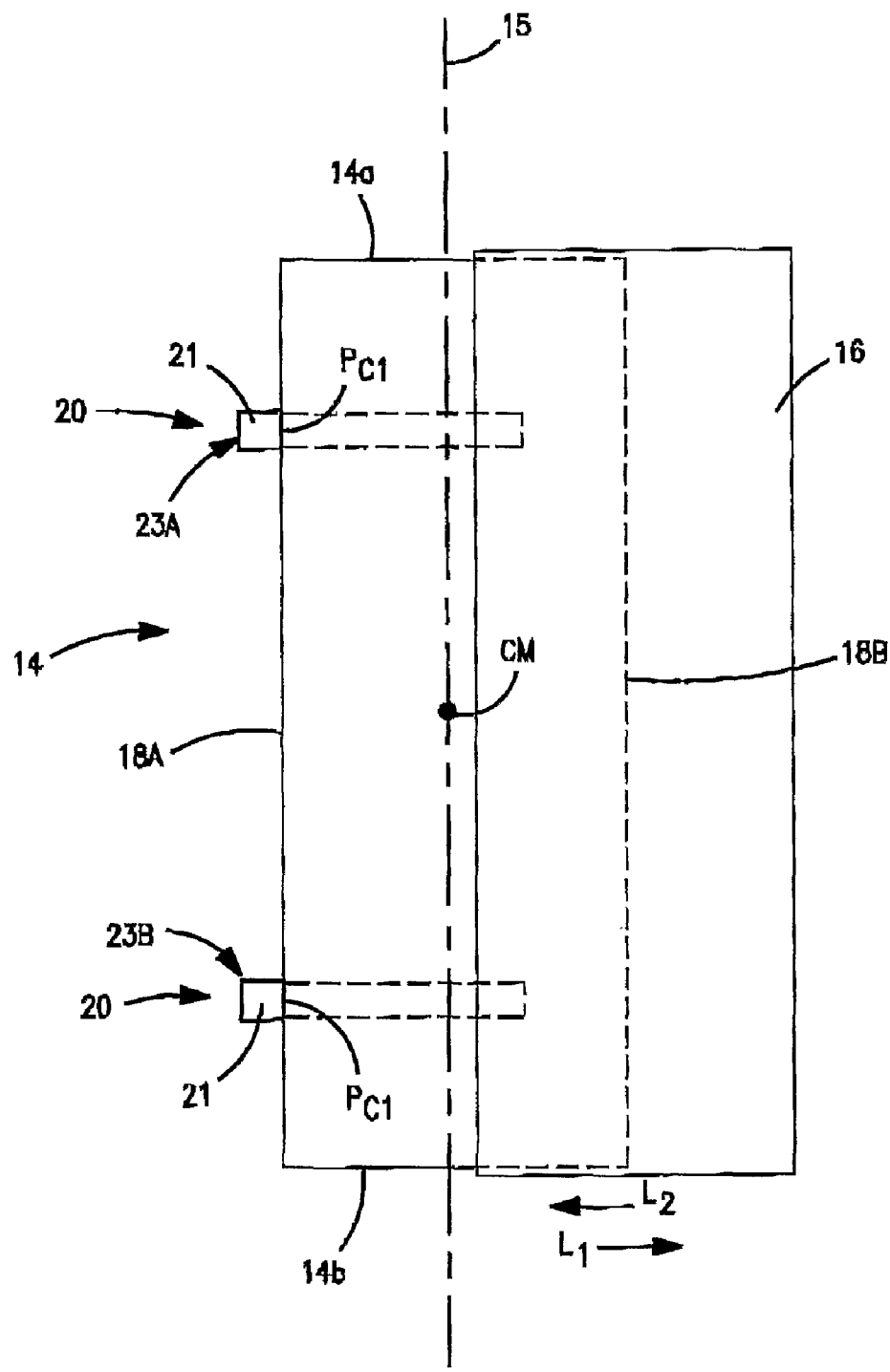
FIG. 5 is a more diagrammatic top plan view of the conveyor and support device.

Referring particularly to FIG. 5, as discussed above, the support device 10 preferably includes two support members 20, specifically first and second support members 23A, 23B. The first and second support members 23A, 23B are spaced apart along the conveyor axis 15 and each has a first end 21 connected with the frame first side 18A at separate positions or locations. More specifically, each one of the first and second support members 23A, 23B is connected with the frame first side 18A at a separate connection point $P_{C1}$, $P_{C2}$, respectively. The two connection points $P_{C1}$, $P_{C2}$ are spaced apart generally along the frame centerline 15 and the frame center of mass CM is disposed generally between the two support member connection points $P_{C1}$, $P_{C2}$. With such an arrangement, each support member 23A, 23B also functions to prevent rotation or tipping of the conveyor 12 about the center of mass CM, such that the support device 10 retains the conveyor 12 spaced above the base surface S with a relatively high degree of stability.

Although two support members 20 are presently preferred, the support device 10 of the present invention may include only a single, appropriately constructed and positioned (i.e., centrally) support member 20, or three or more axially spaced support members 20. For example, the support device 10 may include a single support member 20 connected at least generally proximal to the frame center of mass CM and having a lower portion or base of sufficient width to balance the weight of the frame 14 upon the base surface S to prevent toppling of the conveyor 12 onto the surface S (structure not shown).

Referring to FIGS. 2-4, the endless belt 16 is rotatable about the frame 14 so as to generally displace along the frame central axis 15, and has upper portions 16a disposed generally above the frame upper surface 19A and lower portions 16b disposed generally below the frame lower surface 19B. The conveyor 12 preferably further includes a drive roller 34 rotatably connected with the frame first end 14 and an idler roller 36 rotatably connected with the frame second end 14b and spaced axially from the drive roller 34. As such, the belt 16 extends circumferentially about the drive and idler rollers 32, 34, at least one of the rollers 32 or 34 being adjustably moveable generally along the axis 15 so as to decrease a spacing distance between the two rollers 34, 36. As such, the belt 16 is slidable off of the rollers 34, 36 and is displaceable over the frame second side 18B to separate the belt 16 from the frame 14 while the support member(s) 10 retain the frame 14 spaced above the base surface S.

Referring to FIG. 1, the conveyor 12 is preferably mounted beneath the lower surface $B_L$ of the milling machine body or "mainframe" B so as to have an inlet end 12a located adjacent to a cutting drum D and an outlet end 12b disposed within the mainframe B. In such an application, the conveyor 12 is an "intake" conveyor which removes material cuttings from about the drum D and transports the cuttings to a discharge conveyor, preferably a folding conveyor F, which deposits the cuttings in a dump truck or similar vehicle. Also, the conveyor 12 is fixedly connected with the vehicle V during use, as opposed to being movably connected with the frame B such as the discharge conveyor F, which typically pivots laterally to more readily control discharge of the material cuttings. However, the support device 10 of the present invention may alternatively be used with the folding conveyor F or even on another type of construction vehicle, such as for example, a material transport vehicle (MTV) used in road paving operations.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A support device for a vehicle conveyor, the conveyor being removably connectable with a vehicle and including a frame, the frame having front and rear ends, an axis extending between the two ends, and first and second sides extending between the two ends and located on opposing sides of the centerline, and an endless belt disposed generally about the frame, the support device comprising:

at least one support member having a first end connected with the frame and extending to a second end disposable upon a base surface, the at least one support member being connected with only one of the first and second sides of the frame, the at least one support member being configured to retain the entire conveyor spaced generally above the base surface so as to facilitate removal of the belt from the frame and alternatively facilitate installation of the belt upon the frame with the at least one support member connected with the one of the first and second sides of the frame.

2. The support device as recited in claim 1 wherein the at least one support member first end is connected with the frame first side such that the belt is displaceable over the frame second side generally perpendicular to the frame centerline.

3. The support device as recited in claim 1 wherein the at least one support member first end is one of fixedly connected with the frame and removably connected with the frame.

4. The support device as recited in claim 1 wherein the support member includes a generally cantilever body having a first end connected with the frame and a second, free end disposable upon the base surface.

5. The support device as recited in claim 1 wherein the conveyor frame further has a lower surface, a portion of the belt extending generally beneath the frame lower surface, and the support device is configured to retain the frame at about a vertical distance from the base surface so as to provide a working space between the frame lower surface and the base surface.

6. The support device as recited in claim 1 wherein the frame has a lower surface and the at least one support member has a generally vertical portion providing the member first end and a generally horizontal portion connected with the vertical portion and extending generally beneath the frame lower surface.

7. The support device as recited in claim 6 wherein the at least one support member remains connected with the conveyor frame during use of the conveyor such that the support member horizontal portion remains disposed generally beneath the frame.

8. The support device as recited in claim 1 wherein the at least one support member includes:

a first, generally vertical portion having a first end connected with the frame first side and an opposing second end; and a second, generally horizontal portion connected with the first portion second end and disposable upon the base surface.

9. The support device as recited in claim 8 wherein the frame has a lower surface and the support member second portion is spaced vertically downwardly from the frame lower surface and extends generally between and spaced below the frame first and second sides.

10. The support device as recited in claim 8 wherein the support member first and second portions are integrally formed.

11. The support device as recited in claim 7 wherein the support member includes a bended bar providing the support member first and second portions.

12. The support device as recited in claim 11 wherein the bar is generally L-shaped.

13. A support device for a vehicle conveyor, the conveyor being removably connectable with a vehicle and including a frame, the frame having front and rear ends, an axis extending between the two ends, and first and second sides extending between the two ends and located on opposing sides of the centerline, and an endless belt disposed generally about the frame, the support device comprising:

at least one support member having a first end connected with the frame and a second end disposable upon a base surface, the at least one support member being configured to retain the entire conveyor spaced generally above the base surface so as to facilitate removal of the belt from the frame and alternatively facilitate installation of the belt upon the frame;

wherein the first end of the at least one support member is one of:

configured to releasably connect with the conveyor first side such that the support device is connectable with the frame to perform maintenance on the conveyor and alternatively separate from the frame during use of the conveyor; and pivotally connected with the frame first end such that the frame is angularly moveable between a storage position and a use position.

14. A support device for a vehicle conveyor, the conveyor being removably connectable with a vehicle and including a frame, the frame having front and rear ends, an axis extending between the two ends, and first and second sides extending between the two ends and located on opposing sides of the centerline, and an endless belt disposed generally about the frame, the support device comprising:

at least one support member having a first end connected with the frame and a second end disposable upon a base surface, the at least one support member being configured to retain the entire conveyor spaced generally above the base surface so as to facilitate removal of the belt from the frame and alternatively facilitate installation of the belt upon the frame;

wherein the at least one support member includes first and second support members, each one of the first and second support members being spaced apart along the conveyor axis and having a first end connected with the frame first side.

15. The support device as recited in claim 14 wherein each of the first and second support members includes a generally vertical portion connected with the frame and a generally horizontal portion disposable upon the base surface.

16. The support device as recited in claim 15 wherein the conveyor has center of mass and each of the first and second support members is connected with the frame first side at a separate connection point, the two connection points being spaced apart generally along the frame centerline and the frame center of mass being disposed generally between the two support member connection points.

17. A conveyor for a construction vehicle, the conveyor comprising:
a frame removably connectable with the vehicle, the frame including front and rear ends, a centerline extending between the two ends, and first and second sides extending between the two ends and located on opposing sides of the centerline;
an endless belt disposed generally about the frame; and
at least one support member having a first end connected with the frame and a second end disposable upon a base surface, the at least one support member being configured to retain the entire conveyor spaced generally above the base surface so as to facilitate removal of the belt from the frame and alternatively facilitate installation of the belt upon the frame;
further comprising a drive roller rotatably connected with the frame first end and an idler roller rotatable connected with the frame second end and spaced axially from the drive roller, the belt extending circumferentially about the drive and idler rollers, at least one of the rollers being adjustably moveable generally along the axis so as to decrease a spacing distance between the two rollers such that the belt is slidable off of the rollers and displaceable over the frame second side to separate the belt from the frame while the support member retains the frame spaced above the base surface.

18. A conveyor for a construction vehicle, the conveyor comprising:
a frame removably connectable with the vehicle, the frame including front and rear ends, a centerline extending between the two ends, and first and second sides extending between the two ends and located on opposing sides of the centerline;
an endless belt disposed generally about the frame; and
at least one support member having a first end connected with the frame and a second end disposable upon a base surface, the at least one support member being connected with only one of the first and second sides of the frame, the at least one support member being configured to retain the entire conveyor spaced generally above the base surface so as to facilitate removal of the belt from the frame and alternatively facilitate installation of the belt upon the frame, the belt being displaceable over the other of the first and second sides of the frame with the at least one support member connected with the frame.

19. The conveyor as recited in claim 18 wherein the conveyor belt is laterally displaceable generally over the frame second side while the support retains the belt spaced above the base surface so as to separate the belt from the frame and alternatively to install the belt upon the frame.

20. The conveyor as recited in claim 18 wherein the at least one support member first end is connected with the frame first side such that the belt is displaceable over the frame second side generally perpendicular to the frame centerline.

21. The conveyor as recited in claim 18 wherein the conveyor frame has a lower surface, a portion of the belt extending generally beneath the frame lower surface, and the at least one support member is configured to retain the frame at about a vertical distance from the base surface so as to provide a working space between the frame lower surface and the base surface.

22. The conveyor as recited in claim 18 wherein the frame has a lower surface and the at least one support member has a generally vertical portion providing the member first end and a generally horizontal portion connected with the vertical portion and extending generally beneath the frame lower surface.

23. The conveyor as recited in claim 22 wherein the at least one support member remains connected with the conveyor frame during use of the conveyor such that the support member horizontal portion remains disposed generally beneath the frame.

24. The conveyor as recited in claim 18 wherein the support member includes a generally L-shaped bended bar providing the support member first and second ends.

25. The conveyor as recited in claim 18 wherein the at least one support member includes first and second support members, each one of the first and second support members being spaced apart along the conveyor axis and having a first end connected with the frame first side.

26. The conveyor as recited in claim 25 wherein the conveyor has center of mass and each of the first and second support members is connected with the frame first side at a separate connection point, the two connection points being spaced apart generally along the frame centerline and the frame center of mass being disposed generally between the two support member connection points.

27. A conveyor for a construction vehicle, the conveyor comprising:
a frame removably connectable with the vehicle, the frame including front and rear ends, first and second sides extending between the two ends, and upper and lower surfaces extending between the front and rear ends;
an endless belt disposed generally about the frame; and
a pair of generally L-shaped support members, each support member having a generally vertical portion connected with the frame first side and a generally horizontal portion extending generally beneath the frame lower surface and being disposable upon a base surface, the two support members being configured to retain the entire frame and the belt spaced generally above the base surface so as to facilitate removal of the belt from the frame and alternatively to facilitate installation of the belt upon the frame, the belt being displaceable over the frame second side with the support members connected with the frame first side and supporting the frame lower surface above the base surface.

* * * * *